(12) United States Patent
Ausdenmoore et al.

(10) Patent No.: US 6,415,599 B1
(45) Date of Patent: Jul. 9, 2002

(54) ENGINE INTERFACE FOR AXISYMMETRIC VECTORING NOZZLE

(75) Inventors: Robert M. Ausdenmoore, West Chester; Bernard J. Renggli, Cincinnati, both of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/853,277

(22) Filed: May 11, 2001

(51) Int. Cl.[7] ................................................. F02K 1/00
(52) U.S. Cl. ..................................... 60/230; 239/265.33
(58) Field of Search ........................ 60/230; 239/265.33

(56) References Cited

U.S. PATENT DOCUMENTS

| | | |
|---|---|---|
| 4,022,948 A | 5/1977 | Smith et al. |
| 4,072,372 A | 2/1978 | Korrenn et al. |
| 4,138,166 A | 2/1979 | Riegler et al. |
| 4,214,703 A | 7/1980 | Sorensen et al. |
| 4,892,254 A | 1/1990 | Schneider et al. |
| 4,994,660 A | 2/1991 | Hauer |
| 5,174,502 A | 12/1992 | Lippmeier et al. |
| 5,222,692 A | 6/1993 | Glowacki |
| 5,328,098 A | 7/1994 | Barcza et al. |
| 5,351,888 A | 10/1994 | Taylor et al. |
| 5,485,959 A * | 1/1996 | Wood ..................... 239/265.41 |
| 5,820,024 A | 10/1998 | Ausdenmoore et al. |
| 5,842,643 A | 12/1998 | Lippmeier |
| 6,067,693 A * | 5/2000 | Urruela ........................ 60/230 |
| 6,142,416 A * | 11/2000 | Markstein ................. 244/53 R |
| 6,199,772 B1 | 3/2001 | Renggli |

* cited by examiner

Primary Examiner—Ehud Gartenberg
(74) Attorney, Agent, or Firm—Rodney M. Young; Steven J. Rosen

(57) ABSTRACT

An aircraft gas turbine axisymmetric vectoring nozzle has an interface ring centered about a nozzle, a vectoring ring disposed radially inwardly of and apart from the interface ring, and a bearing radially disposed between the vectoring ring and the interface ring. The bearing may be a sliding bearing having a sliding interface between the vectoring ring and the interface ring and the sliding interface is spherical. The bearing may be constructed of sliding bearing segments having sliding interfaces between the vectoring ring and the interface ring and the sliding interfaces are spherical. Each of the bearing segments includes an outer sliding element attached to the interface ring, an inner sliding element attached to the vectoring ring, and spherically curved outer and inner sliding surfaces on the outer and inner sliding elements respectively wherein the spherically curved outer and inner sliding surfaces define the sliding interfaces between the vectoring ring and the interface ring. At least one of the outer sliding elements is circumferentially disposed and trapped between circumferentially spaced apart rails disposed on a corresponding one of the inner sliding elements. A plurality of interface ring support guides are disposed radially inwardly of and in sliding support relationship with the interface ring and located axially forward of the vectoring ring.

27 Claims, 7 Drawing Sheets

ENGINE INTERFACE FOR AXISYMMETRIC VECTORING NOZZLE

BACKGROUND OF THE INVENTION

1. Field of the Invention

This invention relates generally to axisymmetric variable throat thrust vectoring nozzles and, more particularly, to such nozzles with bearing segments between an interface ring and a vectoring ring that is used to pivot nozzle flaps that vector the nozzle exhaust flow.

2. Discussion of the Background Art

An axisymmetric vectoring exhaust nozzle has been developed for military aircraft applications as disclosed in U.S. Pat. No. 4,994,660, issued to Hauer. The axisymmetric vectoring exhaust nozzle provides thrust vectoring for an axisymmetric convergent/divergent nozzle by universally pivoting the divergent flaps of the nozzle in an asymmetric fashion or, in other words, pivoting the divergent flaps in radial and tangential directions with respect to the unvectored nozzle centerline. This increases maneuverability of the aircraft, both for air to air combat missions and complicated ground attack missions.

Aircraft designers seek to replace or augment the use of conventional aerodynamic surfaces such as flaps and ailerons with vectorable nozzles which turn or vector the exhaust flow and thrust of the gas turbine engine powering the aircraft. The flaps are pivoted by a vectoring ring which can be axially translated and gimballed or tilted about its horizontal and vertical axis (essentially have its attitude adjusted) through a limited range. The vectoring ring is a generally hollow annular structure including radially spaced coaxial inner and outer walls and longitudinally spaced forward and aft walls. The vectoring ring may also be hollow and include internal struts forming a ring stiffening means as described in U.S. Pat. No. 5,820,024.

Vectored thrust produces tangential and radial loads referred to as side loads that are transmitted from the flaps by various load paths back to the engine casing through the actuators. These tremendous loads require heavy actuators to absorb the loads and, particularly, the bending moments exerted on the actuator shafts by thrust vectoring. U.S. Pat. No. 5,174,502, issued to Lippmeier et al., discloses a support for the vectoring ring that transfers at least a portion of the side loads acting generated by a gas turbine engine thrust vectoring nozzle to a relatively stationary portion of the engine. U.S. Pat. No. 5,174,502 discloses an apparatus to minimize or eliminate the side loads transferred by the nozzle to the actuators, reduce or eliminate the bending moments that the actuators would be subject to due to the radial loads, and to minimize the size and weight of the nozzle actuators and hydraulic system used to power the actuators. The support includes pivotal links that allow two degree of freedom (2 DOF) pivoting or gimballing motion and axial translation of the vectoring ring. One of the embodiments has a dual link support means with a rectangular first link pivotally attached to the engine casing by a hinge. The first link is pivotally connected to a second link which in turn is universally hinged to the vectoring ring by a 3 DOF or spherical joint.

Vectoring ring support and actuation apparatuses disposed in an equi-angular manner circumferentially about the engine casing are disclosed in U.S. Pat. No. 6,199,772. A support pivoting means and ring gimballing means allows the vectoring ring attitude adjustments by a set of linear actuators. The vectoring ring support apparatus transfers side loads acting on a vectoring ring and generated by a gas turbine engine thrust vectoring nozzle to a relatively stationary portion of the engine and allows tilting of the vectoring ring to vector the thrust of the nozzle. Each linear actuator is connected by a slider bar to the vectoring ring, a first actuator joint connects the linear actuator to a forward end of the slider bar, and an aft actuator joint connects an aft end of the slider bar to the vectoring ring.

Many modem fighter aircraft systems have an exhaust nozzle interface that provides an aerodynamically smooth transition from the aircraft fuselage to the aircraft engine exhaust nozzle. A typical nozzle interface includes an aircraft tail cone assembly, an exhaust nozzle, and a sealing mechanism between the two often called as "turkey feathers" or "eagle feathers". The turkey feathers are often an integral part of the aircraft tail cone assembly and are often attached to the aircraft tail cone assembly with rivets. The aircraft tail cone assembly is usually attached to the aircraft fuselage with bolts or screws. The interface allows for relative motion between the aircraft and aircraft engine that may occur due to differential radial and axial thermal expansion and differential radial motion due to aircraft applied maneuver loads and/or gyroscopic moments. It is desirable that an interface provides good air sealing between the aircraft and aircraft engine for all aircraft and engine operating conditions, has a lightweight and low cost design which minimizes aerodynamic drag, is easy to assemble and disassemble, is easy to maintain, and does not add significant radar cross section to the aircraft system.

The axisymmetric vectoring exhaust nozzle's outer shroud is attached to an exhaust duct of the engine by a multitude of individual brackets known as shroud supports instead of being attached directly to or fabricated as part of the exhaust duct. The shroud supports are used because the movement of the vectoring ring requires the elimination of the section of the exhaust duct cone that would otherwise support the shroud as done in non-vectoring engines. The outer flaps translate axially while the outer shroud remains stationary thereby creating a step between the two components and subsequent undesirable additional aerodynamic drag.

SUMMARY OF THE INVENTION

Briefly, in accordance with one aspect of the present invention, an aircraft gas turbine engine axisymmetric vectoring nozzle has an interface ring centered about a nozzle centerline, a vectoring ring disposed radially inwardly of and apart from the interface ring, and a bearing radially disposed between the vectoring ring and the interface ring. In a more particular embodiment of the invention, the bearing is a sliding bearing having a sliding interface between the vectoring ring and the interface ring and the sliding interface is spherical in shape. In the exemplary embodiment of the invention, the bearing is constructed of bearing segments which are sliding bearing segments including sliding interfaces between the vectoring ring and the interface ring and the sliding interfaces are spherical in shape.

Each of the bearing segments includes an outer sliding element attached to the interface ring, an inner sliding element attached to the vectoring ring, and spherically curved outer and inner sliding surfaces on the outer and inner sliding elements respectively wherein the spherically curved outer and inner sliding surfaces define the sliding interfaces between the vectoring ring and the interface ring. At least one of the bearing segments has an outer sliding element that is circumferentially disposed and trapped between circumferentially spaced apart rails disposed on a corresponding one of the inner sliding elements. In a yet more particular embodiment of the invention, a plurality of interface ring support guides are disposed radially inwardly of and in sliding support relationship with the interface ring and located axially forward of the vectoring ring.

One embodiment of the present invention is an aircraft gas turbine engine axisymmetric vectoring exhaust nozzle apparatus having the vectoring ring operably linked to a plurality of pivotal flaps by universal joints, circumferentially disposed about a nozzle centerline, and bounding an exhaust gas flowpath in the nozzle. Each of the universal joints has at least two rotational degrees of freedom. A linear actuation and vectoring ring support apparatus is operably connected to the vectoring ring for actuating and supporting the vectoring ring. The apparatus includes a linear actuator connected by a slider bar to the vectoring ring, a first actuator joint connecting the linear actuator to a forward end of the slider bar, and an aft actuator joint connecting an aft end of the slider bar to the vectoring ring. The apparatus further includes a vectoring ring support for slidably supporting the slider bar, restraining circumferential movement of the vectoring ring, and transferring side loads acting on the vectoring ring to a relatively stationary portion of the engine. The interface ring is centered about the nozzle centerline and disposed radially outwardly of and apart from the vectoring ring, and the bearing is radially disposed between the vectoring ring and the interface ring. A plurality of interface ring support guides are disposed radially inwardly of and in sliding support relationship with the interface ring and located axially forward of the vectoring ring. The interface ring support guides are attached to a casing of the engine by a support structure mounted on the casing.

The present invention provides an interface between the aircraft and aircraft engine for all aircraft and engine operating conditions. The invention provides good air sealing, is lightweight, and has a low cost design which minimizes aerodynamic drag. The invention is easy to assemble and disassemble, is easy to maintain, and does not add significant radar cross section to the aircraft system. The present invention eliminates a step between the outer flaps which translate axially and the outer shroud which remains stationary and eliminates subsequent undesirable additional aerodynamic drag.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
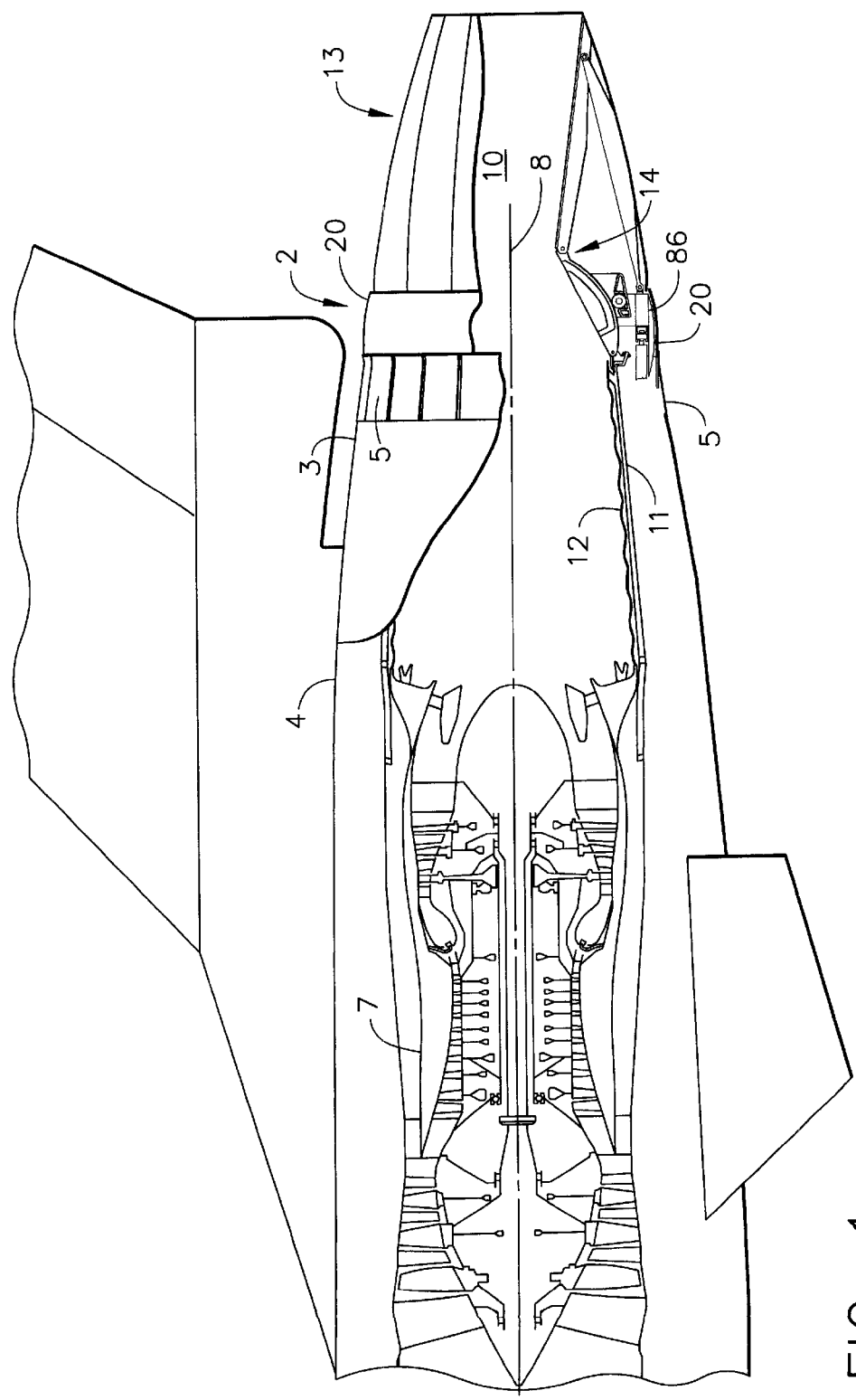
FIG. 1 is a partial cut-away cross-sectional view illustration of an aircraft gas turbine engine mounted to an aircraft fuselage and having an axisymmetric vectoring exhaust nozzle with an exemplary embodiment of an exhaust nozzle interface of the present invention.

Illustrated in FIG. 1 is an exemplary aircraft gas turbine engine 7 mounted to an aircraft fulselage 4 and having a gas turbine engine axisymmetric vectoring exhaust nozzle 14, of the convergent divergent type as referenced previously in the Hauer patent, in the exhaust section 10 of the engine. An exemplary embodiment of an exhaust nozzle interface 2 of the present invention is disposed between an aircraft tail cone assembly 3 of the aircraft fuselage 4 and the axisymmetric vectoring nozzle 14. The axisymmetric vectoring nozzle 14 is mounted to the aircraft fulselage 4 and a sealing mechanism 5 is disposed between the cone assembly 3 and the axisymmetric vectoring nozzle 14. The sealing mechanism 5 provides an aerodynamically smooth transition from the aircraft fulselage 4 to the aircraft engine exhaust or vectoring nozzle 14. The sealing mechanism 5 is in the form of elongated seals often referred to as "turkey feathers" or "eagle feathers". The turkey feathers are considered part of the aircraft tail cone assembly and may be attached to the aircraft tail cone assembly with rivets. The aircraft tail cone assembly is attached to the aircraft fuselage such as with bolts or screws. The "turkey feathers" seal against an interface ring 20 which surrounds a vectoring ring 86 which gimbals and vectors the thrust of the nozzle 14. The aircraft gas turbine engine 7 includes, in serial flow relationship, a fixed area exhaust duct or engine casing 1 1 with an afterburner liner 12 and a variable area downstream section 13 including the axisymmetric vectoring nozzle 14.

Figure 2:
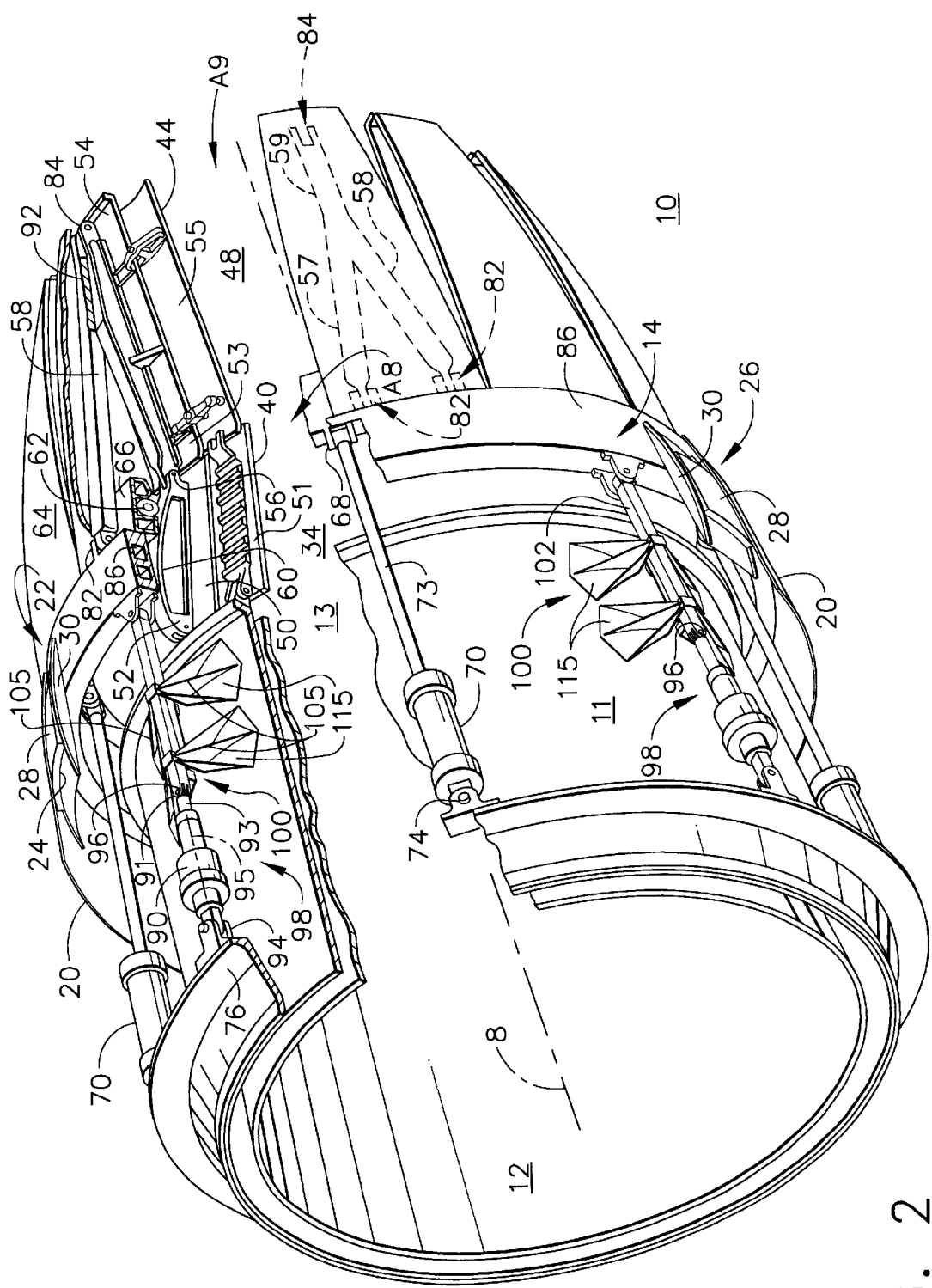
FIG. 2 is a partial cut-away perspective view illustration of the gas turbine engine axisymmetric vectoring exhaust nozzle with the exhaust nozzle interface illustrated in FIG. 1.
Figure 3:
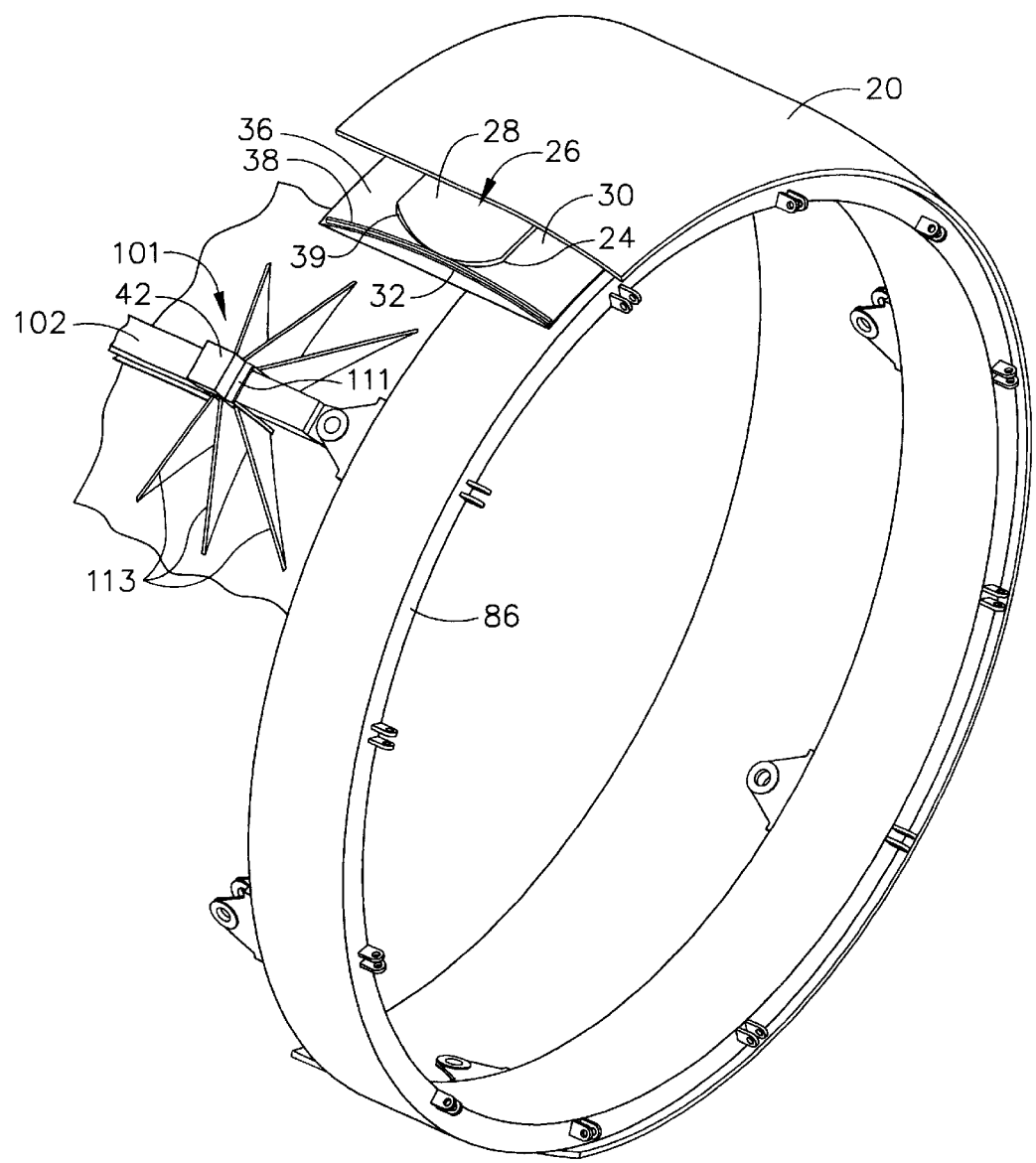
FIG. 3 is an enlarged perspective view of the exhaust nozzle interface illustrated in FIG. 2.
Figure 4:
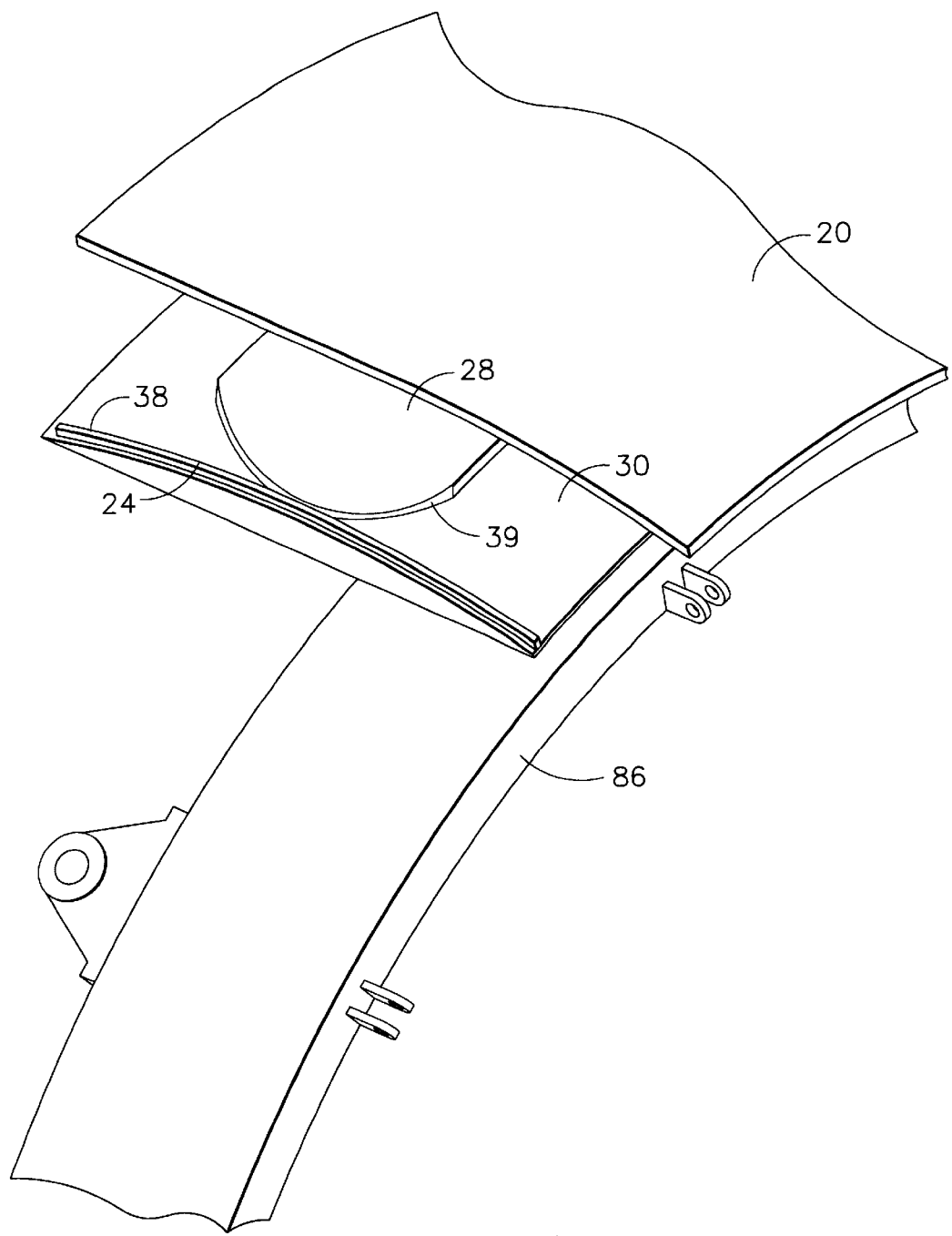
FIG. 4 is an enlarged perspective view of a bearing segment of the exhaust nozzle interface illustrated in FIG. 3.
Figure 5:
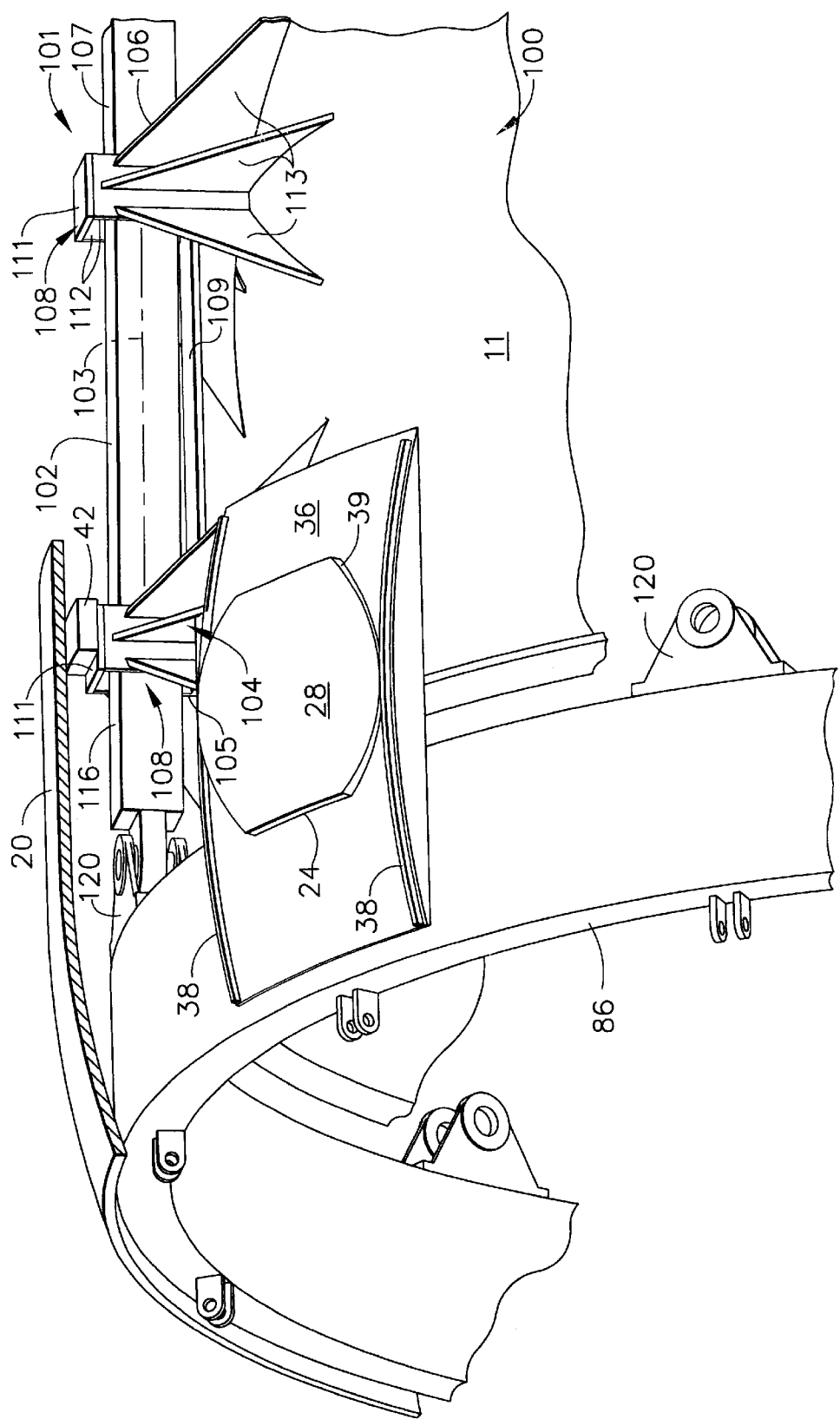
FIG. 5 is an enlarged perspective view of the bearing segment and the exhaust nozzle interface illustrated in FIG. 3.
Figure 6:
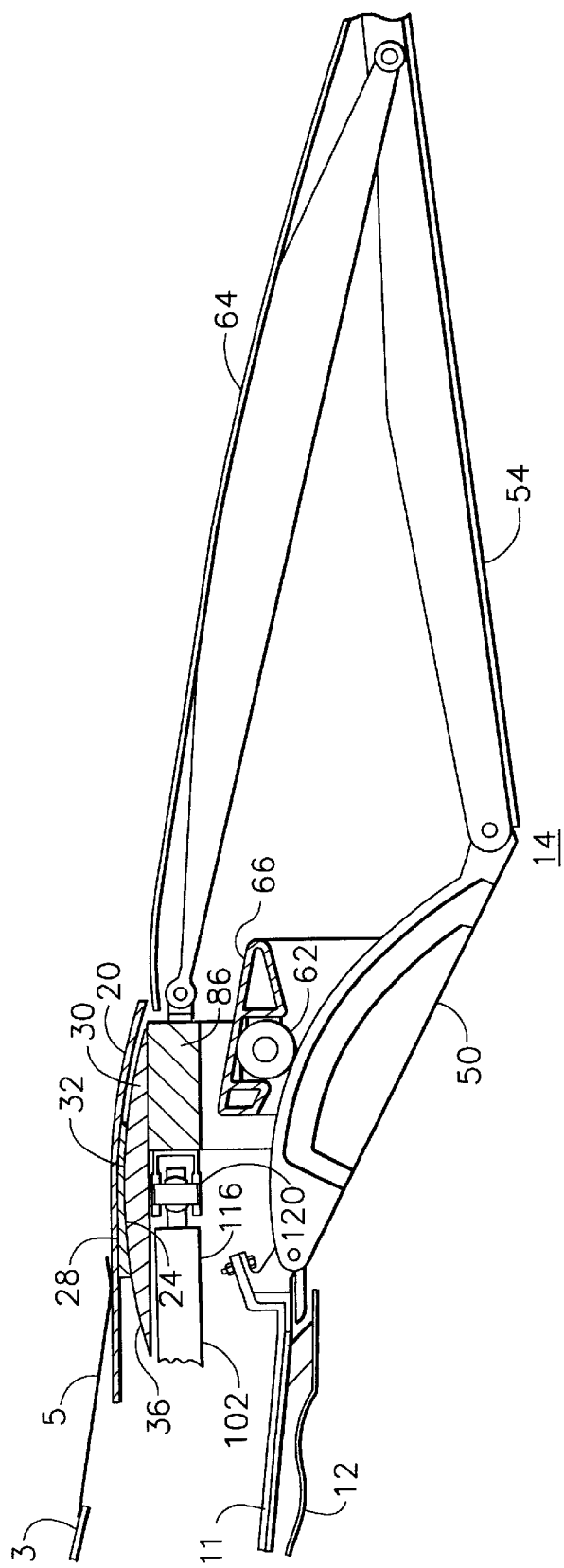
FIG. 6 is a cross-sectional schematical illustration of the gas turbine engine axisymmetric vectoring exhaust nozzle with the exhaust nozzle interface illustrated in FIG. 1.

Further referring to FIG. 2, the nozzle 14 comprises, in serial flow relationship, a convergent section 34, a throat 40 and a divergent section 48. The convergent section 34 includes a plurality of convergent or primary flaps 50 circumferentially disposed about a nozzle centerline 8 (which coincides with an engine centerline) with overlapping primary seals 51 disposed between and in sealing engagement with the radially inward facing surface of circumferentially adjacent primary flaps 50. Primary flap 50 is pivotally attached at its forward end to casing 11 by first pivotal or clevis joint 52. A divergent or secondary flap 54 is pivotally attached at its forward end 53 to the aft end of primary flap 50 by a universal two degree of freedom (2 DOF) joint such as a flap ball joint 56 generally at an axial position in the nozzle 14 which coincides with throat 40. Secondary flaps 54 are generally circumferentially disposed about engine nozzle centerline 8 with overlapping divergent or secondary seals 55 disposed between and in sealing engagement with the radially inward facing surface of circumferentially adjacent secondary flaps 54. Throat 40 has associated with it a throat area conventionally referred to as A8 and the nozzle exit 44 is generally at the end of secondary flaps 54 and has an exit area associated with it conventionally referred to as A9.

A plurality of rollers 62 are disposed in a primary ring structure 66 which in turn is translated forward and aft by a plurality of primary actuators 70, of which there are three in the exemplary embodiment illustrated herein. More than three primary actuators 70 may be used in conjunction with the present invention. The variable throat area A8 is controlled by the action of cam roller 62 on the cam surface 60 which is formed on the back of primary flap 50. During operation, the high pressure of the exhaust gases within the nozzle force primary flaps 50 and secondary flaps 54 radially outward, thus, keeping cam surface 60 in contact with cam roller 62. A conical annular actuator support 76 is mounted at its narrow forward end to engine casing 11 and primary actuator 70 is pivotally connected to the wide aft end of the conical actuator support 76 by a universal ball joint 74. Primary actuator 70 has an actuator rod 73 which in turn is connected to primary ring structure 66 by a spherical joint 68.

The vectoring ring 86 is used to control the positioning or pivoting of secondary flaps 54 to provide thrust vectoring. The vectoring ring may be hollow and include internal struts to stiffen the vectoring ring as described in U.S. Pat. No. 5,820,024. A plurality of vectoring actuators 90, of which there are three in the exemplary embodiment, are equi-angularly disposed circumferentially around casing 11 and mounted to conical actuator support 76 by universal ball joints 94 in a similar manner as actuators 70. Secondary flaps 54 are pivotally connected to primary flaps 50 by the flap ball joint 56 and is pivotally controlled in a multi-degree of freedom manner by a plurality of respective Y-frames 59 having control arms 57 and 58 that operably connect the vectoring ring 86 to secondary flap 54. Outer flaps 64 are at least partially supported by Y-frames 59 and provide a clean and smooth aerodynamic shape along the exterior of the nozzle.

Control arms 57 and 58 are connected to the vectoring ring 86 by 3 DOF spherical joints 82 and to the aft end of secondary flap 54 by a spherical joint 84. This linkage is operable to translate an attitude change of vectoring ring 86 into a multi-degree of freedom pivoting change or orbital movement of secondary flap 54 whereby each secondary flap may be pivoted through a different angle. Backbone 92 provides a mount for secondary flap 54 and support for joint 84 and flap ball joint 56 at its two ends. A linear actuation and vectoring ring support apparatus 98 supports and actuates the vectoring ring 86. The linear actuation and vectoring ring support apparatus 98 includes a vectoring ring support apparatus 100 and is illustrated as part of the exhaust section 10 of the engine.

Each of the vectoring ring apparatuses 100 includes at least one and preferably two axially spaced apart forward and aft guide assemblies 101 and 104, respectively. Each guide assembly 104 has a support structure 106 with two circumferentially spaced apart legs 105 that support a hollow guide 108 within which is slidably disposed an axially translatable slider bar 102 having a bar axis 103. The guide 108 has circumferentially spaced apart slider surfaces 112 on corresponding sides of the legs 105. The legs 105 are reinforced by braces or gussets 113 attached to a base 115 of the guide assemblies 104 to provide additional strength and stability to the support structure 106. The hollow guide 108 includes circumferentially spaced apart slider surfaces on corresponding sides of the legs 105. Radially inner and outer webs 109 and 111, respectively, connect the legs 105 thus forming the hollow guide 108. The legs 105 are fixedly mounted on a relatively stationary portion of the engine such as the exhaust duct or engine casing 11. The vectoring ring support apparatus 100 provides a circumferential ring support for slidably supporting the slider bar, restraining circumferential movement of the vectoring ring, and transferring side loads acting on the vectoring ring to a relatively stationary portion of the engine.

Figure 7:
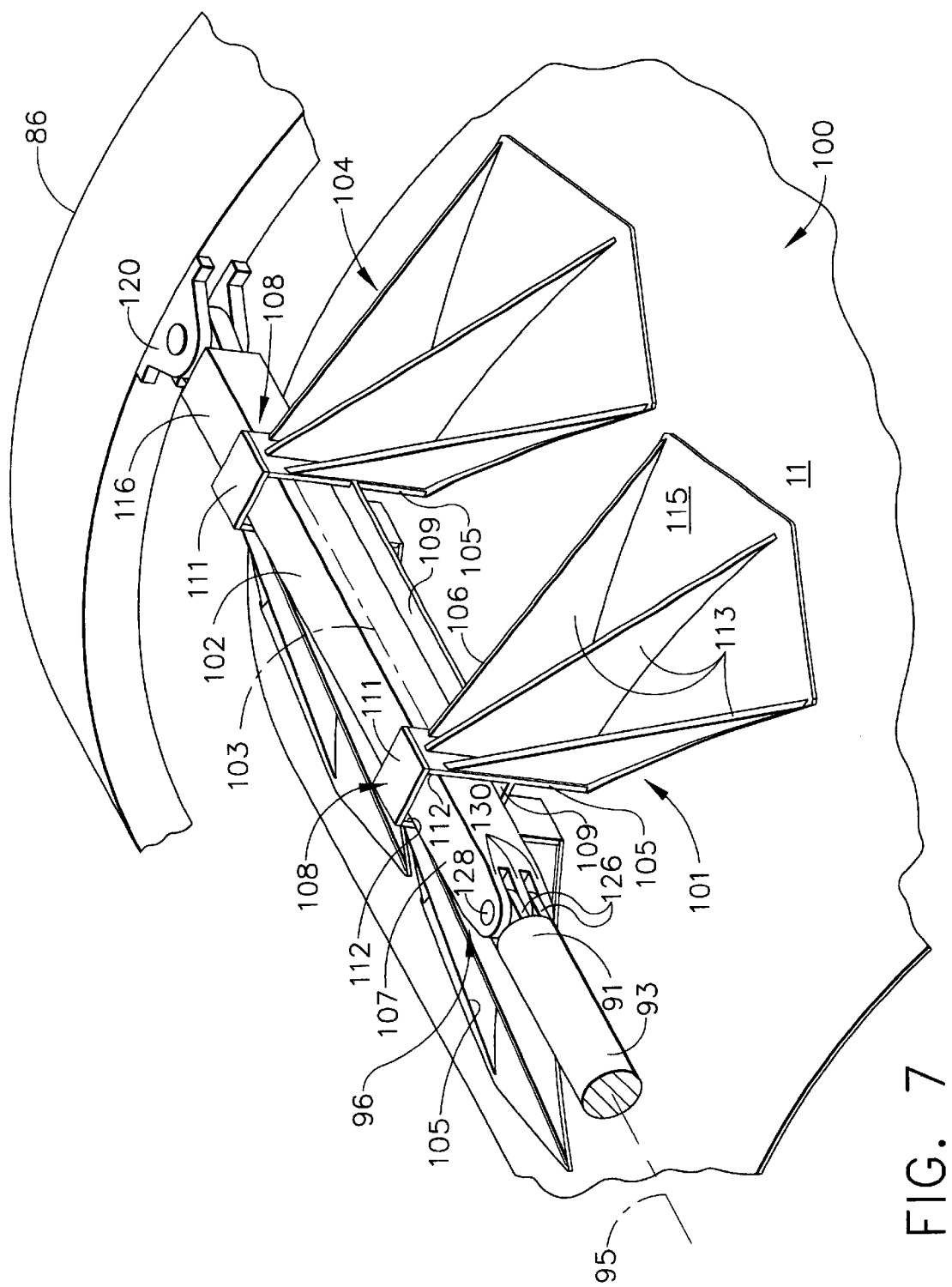
FIG. 7 is an enlarged view of the linear actuation and vectoring ring support apparatus illustrated in FIGS. 2, 3, and 5.

Referring further to FIG. 7, each of the vectoring actuators 90 includes a vectoring actuator rod 93 disposed about an actuator axis 95. A first aft end 91 of the vectoring actuator rod 93 is connected to a first forward end 107 of the slider bar 102 by a forward actuator joint 96 having a single rotational degree of freedom. The forward actuator joint 96 is preferably a clevis joint illustrated as having two lugs 126 on the first aft end 91 of the vectoring actuator rod 93 which are interdigitated with and pivotably pinned by a first pin 128 to three lugs 130 on the first forward end 107 of the slider bar 102. The first pin 128 has an axis that intersects and is perpendicular to the nozzle centerline 8. The clevis joint permits the actuator axis 95 to be out of alignment with the bar axis 103. This accommodates manufacturing and assembly tolerances between the actuator support 76 on the engine casing 11 and the support structure 106. The pinned forward actuator joint 96 also keeps the actuator rod 93 and the slider bar 102 in alignment in a radial plane through the nozzle centerline 8, thus, preventing them from buckling relative to each other. The vectoring ring 86 is connected to a second aft end 116 of the slider bar 102 by a second joint 120 which is a universal joint and, preferably, a ball joint having three rotational degrees of freedom.

The linear actuation and vectoring ring support apparatuses 98 provides for the vectoring ring 86 to be axially translated and tilted about centerline 8 in order to control its attitude. The three vectoring actuators 90 and the corresponding three linear actuation and vectoring ring support apparatuses 100 are equi-angularly disposed circumferentially about casing 11, that allows vectoring ring 86 to be axially translated and gimballed by the vectoring actuators 90. The slider bar 102, the forward actuator joint 96, and the second joint 120 allows the actuator 90 to both tilt and translate the vectoring ring 86 by simultaneously or differentially extending the three actuators 90. The guide assembly 104 eliminates the transfer of side loads acting in a direction tangential to the engine casing 11 that may otherwise be imparted to the actuator. The guide assembly 104 allows the slider bar 102 to absorb circumferential loads from vectoring ring 86 and transfer it to the engine casing 11 so that the three vectoring ring support apparatuses 100 act together to prevent sideways movement of the vectoring ring. The vectoring ring support apparatuses 100 allow attitude adjustment or gimballing and translation of the vectoring ring 86 and also permit axial translation of the vectoring ring to provide control of exit area A9. The slider bar 102 illustrated in FIG. 2 has a solid rectangular cross-section and slides along the slider surfaces inside the hollow guide 108. The slider bar 102 may alternatively have a hollow rectangular cross-section and acts as a hollow box beam. The linear actuation and vectoring ring support apparatus 98 is more fully explained and other embodiments are disclosed in U.S. Pat. No. 6,199,772.

The exemplary embodiment of the invention is illustrated in greater detail in FIGS. 2–6. The aircraft gas turbine engine axisymmetric vectoring nozzle 14 includes the interface ring 20 centered about the nozzle centerline 8, the vectoring ring 86 disposed radially inwardly of and apart from the interface ring, and a bearing 22 radially disposed between the vectoring ring and the interface ring. The exemplary embodiment of the bearing 22 is a sliding bearing having a sliding interface 24 between the vectoring ring 86 and the interface ring 20 and the sliding interface is spherical in shape. In the exemplary embodiment of the invention, the bearing is constructed of bearing segments 26 which are sliding bearing segments including sliding interfaces 24 between the vectoring ring 86 and the interface ring 20. The sliding interfaces 24 are spherical in shape.

Each of the bearing segments 26 includes an outer sliding element 28 attached to the interface ring 20, an inner sliding element 30 attached to the vectoring ring 86, and spherically curved outer and inner sliding surfaces 32 and 36 on the outer and inner sliding elements, respectively, wherein the spherically curved outer and inner sliding surfaces define the sliding interfaces between the vectoring ring and the interface ring. The surfaces outer and inner sliding surfaces 32 and 36 may be made of a material or coating containing teflon. A spray of Teflon material or other forms of polytetrafluoroethylene (PTFE) material can be used. At least one of the bearing segments 26 has an outer sliding element 28 that is circumferentially disposed and trapped between a pair of circumferentially spaced apart axially extending rails 38 disposed on a corresponding one of the inner sliding elements 30. Though only one of the bearing segments 26 has an outer sliding element 28 that is circumferentially trapped between the pair of circumferentially spaced apart axially extending rails 38, other ones of the bearing segments 26 may be similarly constructed. The outer sliding elements 28 have circumferentially spaced apart curved sides 39 so that they have a limited degree of rotation between the circumferentially spaced apart axially extending rails 38 while still trapped between the inner sliding elements 30 and the interface ring 20. A plurality of interface ring support guides 42 are disposed radially inwardly of and in sliding support relationship with the interface ring 20 and located axially forward of the vectoring ring 86. The interface ring support guides 42 are disposed on the outer webs 111 of the hollow guides 108. The hollow guides 108 mounted on top of the forward guide assemblies 101 are in turn supported and connected to the casing 11 by the support structure 106 with the two circumferentially spaced apart legs 105.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by letters patent of the united states is the invention as defined and differentiated in the following claims:

What is claimed is:

1. An aircraft gas turbine engine axisymmetric vectoring nozzle comprising:
    an interface ring centered about a nozzle centerline,
    a vectoring ring disposed radially inwardly of and apart from said interface ring, and
    a bearing radially disposed between said vectoring ring and said interface ring.

2. An apparatus as claimed in claim 1 wherein said bearing is a sliding bearing including a sliding interface between said vectoring ring and said interface ring.

3. An apparatus as claimed in claim 2 wherein said sliding interface is spherical in shape.

4. An apparatus as claimed in claim 1 wherein said bearing comprises bearing segments.

5. An apparatus as claimed in claim 4 wherein said bearing segments are sliding bearing segments having sliding interfaces between said vectoring ring and said interface ring.

6. An apparatus as claimed in claim 5 wherein there are three or more of said bearing segments.

7. An apparatus as claimed in claim 4 wherein said sliding interface bearing is spherical in shape and said bearing segments include sliding interfaces between said vectoring ring and said interface ring.

8. An apparatus as claimed in claim 7 wherein each of said bearing segments comprises:
    an outer sliding element attached to said interface ring,
    an inner sliding element attached to said vectoring ring, and
    spherically curved outer and inner sliding surfaces on said outer and inner sliding elements respectively wherein said spherically curved outer and inner sliding surfaces define said sliding interfaces between said vectoring ring and said interface ring.

9. An apparatus as claimed in claim 8 wherein at least one of said outer sliding elements is circumferentially disposed and trapped between circumferentially spaced apart rails disposed on a corresponding one of said inner sliding elements.

10. An apparatus as claimed in claim 1 further comprising a plurality of interface ring support guides disposed radially inwardly of and in sliding support relationship with said interface ring and located axially forward of said vectoring ring.

11. An apparatus as claimed in claim 10 wherein said bearing is a sliding bearing including a sliding interface between said vectoring ring and said interface ring and said sliding interface is spherical in shape.

12. An apparatus as claimed in claim 10 wherein said bearing comprises bearing segments, said bearing segments are sliding bearing segments including sliding interfaces between said vectoring ring and said interface ring, and said sliding interfaces are spherical in shape.

13. An apparatus as claimed in claim 12 wherein each of said bearing segments comprises:
    an outer sliding element attached to said interface ring,
    an inner sliding element attached to said vectoring ring, and
    spherically curved outer and inner sliding surfaces on said outer and inner sliding elements respectively wherein said spherically curved outer and inner sliding surfaces define said sliding interfaces between said vectoring ring and said interface ring.

14. An apparatus as claimed in claim 13 wherein at least one of said outer sliding elements is circumferentially disposed and trapped between circumferentially spaced apart rails disposed on a corresponding one of said inner sliding elements.

15. An aircraft gas turbine engine axisymmetric vectoring exhaust nozzle apparatus comprising:
    a vectoring ring operably linked to a plurality of pivotal flaps by universal joints having at least two rotational degrees of freedom and circumferentially disposed about a nozzle centerline and bounding an exhaust gas flowpath in the nozzle;
    a linear actuation and vectoring ring support apparatus operably connected to said vectoring ring for actuating and supporting said vectoring ring, said apparatus comprising;
    a linear actuator connected by a slider bar to the vectoring ring,
    a first actuator joint connecting said linear actuator to a forward end of said slider bar and an aft actuator joint connecting an aft end of said slider bar to the vectoring ring,
    a vectoring ring support for slidably supporting said slider bar, restraining circumferential movement of the vectoring ring, and transferring side loads acting on the vectoring ring to a relatively stationary portion of the engine, an interface ring centered about said nozzle centerline and disposed radially outwardly of and apart from said vectoring ring, and a bearing radially disposed between said vectoring ring and said interface ring.

16. An apparatus as claimed in claim 15 further comprising a plurality of interface ring support guides disposed radially inwardly of and in sliding support relationship with said interface ring and located axially forward of said vectoring ring said interface ring support guides attached to a casing of the engine by a support structure mounted on said casing.

17. An apparatus as claimed in claim 10 wherein said bearing is a sliding bearing including a sliding interface between said vectoring ring and said interface ring and said sliding interface is spherical in shape.

18. An apparatus as claimed in claim 16 wherein said bearing comprises bearing segments, said bearing segments are sliding bearing segments including sliding interfaces between said vectoring ring and said interface ring, and said sliding interfaces are spherical in shape.

19. An apparatus as claimed in claim 18 wherein each of said bearing segments comprises:

an outer sliding element attached to said interface ring, an inner sliding element attached to said vectoring ring, and spherically curved outer and inner sliding surfaces on said outer and inner sliding elements respectively wherein said spherically curved outer and inner sliding surfaces define said sliding interfaces between said vectoring ring and said interface ring.

20. An apparatus as claimed in claim 19 wherein at least one of said outer sliding elements is circumferentially disposed and trapped between circumferentially spaced apart rails disposed on a corresponding one of said inner sliding elements.

21. An apparatus as claimed in claim 20 wherein said vectoring ring support comprises at least one guide assembly having a hollow guide mounted on a casing of the engine by said support structure and said slider bar slidably supported within said hollow guide.

22. An apparatus as claimed in claim 21 wherein said at least one guide assembly is a forward guide assembly and the nozzle further comprises an aft guide assembly wherein said aft guide assembly is spaced apart from and located aft of said forward guide assembly.

23. An apparatus as claimed in claim 22 wherein said aft actuator joint comprises a 3 degree of freedom means for attaching said slider bar to the vectoring ring.

24. An apparatus as claimed in claim 23 wherein said forward actuator joint has one rotational degree of freedom.

25. An apparatus as claimed in claim 24 wherein said 3 degree of freedom means comprises a ball joint having three rotational degrees of freedom.

26. An apparatus as claimed in claim 25 wherein said forward actuator joint is a clevis joint including two lugs interdigitated with and pivotably pinned to three lugs.

27. An apparatus as claimed in claim 26 wherein said support further comprises circumferentially spaced apart legs connected by radially inner and outer webs.

* * * * *